United States Patent Office 3,682,698
Patented Aug. 8, 1972

3,682,698
METHOD OF COATING SURFACE WITH POLYMER MATERIAL
Peter J. Palmer and Thomas A. Anderson, London, England, assignors to Westinghouse Brake English Electric Semi-Conductors Limited, London, England
No Drawing. Filed Jan. 9, 1970, Ser. No. 1,857
Claims priority, application Great Britain, Jan. 22, 1969, 3,500/69
Int. Cl. H01l 1/10
U.S. Cl. 117—200       6 Claims

ABSTRACT OF THE DISCLOSURE

A method for applying a coating of a polyimide to a surface, comprising the steps of applying a layer of a solution of a polyimide polymerizable by condensation polymerization to said surface, and polymerizing the layer at an elevated temperature and at a super atmospheric pressure exerted by an inert gas applied directly to said layer, to provide a polymeric coating undistorted by the chemical condensation products of the condensation polymerization evaporating therefrom.

---

This invention relates to the coating of a surface of a body with a resin and particularly to the coating of a surface of a semiconductor body with a cured polyimide resin.

According to the invention there is provided a method of applying a polymer coat to a surface of a body, including the steps of applying a layer of a solution of polymeric material to said surface and polymerizing the layer under a super atmospheric pressure at an elevated temperature to a coat of polymer, whereby chemical condensation products of the polymeric material do not distort the coat on evaporation therefrom.

The body so-coated may be a body of semiconductor material, for example, a diode or thyristor element, and the coating may be applied over any junction areas on the surface of this body.

The polymer may be a polyimide and the polymerizing of the layer may be carried out in a pressure vessel in an atmosphere, which may be air, nitrogen or argon, at a pressure between 50 and 1,000 p.s.i.g. and at a temperature between 50 and 270° C.

The atmosphere may be a flow of an inert gas at such a pressure.

Embodiments of the invention will now be described.

Polymeric materials are known which when dissolved in a suitable solvent and applied as a layer to a surface on a body can be polymerized to a polymer coat. However, to bring about polymerization, firstly the solvent and then any chemical condensation products of polymerization have to be removed. This removal is usually brought about by the heat which initiates polymerization evaporating the unwanted materials away.

Polyimide coatings are particularly suitable polymer coatings for use on the junction areas of semiconductor devices, for example, diodes or thyristors whose elements may be various forms, such as cylindrical or rectangular. The coating protects the surface of the semiconductor material and also passivates the device so that surface leakage currents, under the influence of high temperature and high reverse electrical bias, are reduced. The coating also minimises changes in electrical properties during the life of the device.

Methods of producing a polyimide coat are known and these involve heating the polymeric layer. To prevent the solvent and condensation products disturbing the surface of the coating by bubbling through it when they evaporate under the action of the heat, it is necessary to polymerize the material very slowly and only apply a thin layer of polymeric material to the surface. Polymerization has theretofore been carried out at atmospheric pressure, but the thickness of coating satisfactorily obtained at atmospheric pressure without overlong polymerization times is not sufficient for the required improvement in semiconductor device properties. However, coatings embodying the invention are polymerized by heating under pressure, for example, in a temperature controlled autoclave. The pressure inside the autoclave may be exerted by a suitable gas, such as air, argon, nitrogen.

One coating process will now be described, using a polyimide varnish type DE 910-103, as obtained from de Beers Laboratories Incorporated, of Chicago, Ill., U.S.A. This varnish consists of a solution of a polymeric material in a solvent.

Polyimide varnish type DE 910-103 when cured has a melting point in excess of 600° F. a pencil hardness of 64–94, a dielectric strength, dry at 25° C. of 4500 V.P.M.; a dielectric constant, at 1000 cps. and 25° C. of 3.32, a dissipation factor at 1000 cps. (%) and 25° C. of 0.75 and an insulation resistance in boiling water for 10 minutes of 500,000 megohms. Another suitable polyimide material is that known as "Pyre-M.L." and made by Du Pont de Nemours Co., Ltd., of U.S.A. A layer of the varnish is applied to the surface to be coated. The surface and the layer are then placed in the autoclave and heated, pressure being increased at the same time. Initially, the solvent evaporates from the layer but, as the temperature is raised, a chemical condensation reaction takes place in the polymeric layer as the material polymerizes. A by-product of the polymerization is water. When polymerization is carried out at atmospheric pressure, the water is vapour at the polymerization temperature and evaporates through the coating causing bubbles and distorting the coating. By increasing the pressure during polymerization, the formation of bubbles is prevented and a thicker coating can be obtained with a single application, and a shorter polymerization time is also used. Suitable conditions for polymerizing the varnish mentioned above are pressure between 50 and 1,000 p.s.i.g. and temperatures in the range from 50 to 270° C.

The presence of a polyimide coating on the surface of a semiconductor junction modifies the properties of the surface advantageously. For example, the surface leakage currents at temperatures in the range of 200° C. are much reduced, considerably improving the preformance of the device. The surface of the semiconductor is protected by the coating and changes in the surface material are minimised. This ensures that the electrical properties of the device are more stable during its life.

In a preferred embodiment this coating is applied to semiconductor devices of substantially cylindrical form in which one or more junctions appear on the curved periphery. The semiconductor element is normally sandwiched between two circular contact areas. The assembly of contacts and element can be etched to remove work damage and impurities from the surfaces of the semiconductor element and to shape the correct configuration of the peripheral surface; and the polyimide coating is then applied to seal the etched surface against further contamination. The assembled coated element can then be tested before it is mounted on, for example, a copper stud. If the element is soldered to this stud, the polyimide coating will withstand the soldering operation. This sequence of operations is an advantage over the previously known sequence, in which the assembled device is mounted and then etched coated and tested, as if the device is then found to be faulty, several operations have been wasted, while the etching of mounted devices can result in contamination.

Very thin films of polyimide coating can be produced by spinning the coated body before polymerizing the layer. In this way polymerization produced by the application of heat will cause fewer bubbles to be produced by evaporation of condensation by-products.

Although the coating process has been described above with reference to a proprietary polyimide varnish, the invention is not limited to this particular varnish, other polymeric materials being suitable.

Having thus described our invention what we claim is:

1. A method of applying a polyimide coating to a surface of a body, including the steps of applying a layer of a solution of a polyimide polymerizable by condensation polymerization to said surface and polymerizing the layer at an elevated temperature and at a super atmospheric inert gas pressure applied directly to said layer to provide a polymeric coating undistorted by the chemical condensation products of the condensation polymerization evaporating therefrom.

2. A method as claimed in claim 1 in which the super atmospheric pressure is between 50 and 1,000 p.s.i.g.

3. A method as claimed in claim 1 in which the elevated temperature is within the range of 50 to 270° C.

4. A method as claimed in claim 1 in which the gas is selected from the group consisting of air, nitrogen and argon.

5. A method as claimed in claim 1 wherein the body is of semiconductor material.

6. A method as claimed in claim 5 in which the body of semiconductor material has a junction extending to the surface of the body.

References Cited
UNITED STATES PATENTS

| | | | |
|---|---|---|---|
| 2,258,218 | 10/1941 | Rochow | 117—161 ZA |
| 3,565,549 | 2/1971 | Lubowitz et al. | 117—126 GB |
| 2,922,734 | 1/1960 | Kohn et al. | 117—65.2 |
| 3,367,025 | 2/1968 | Doyle | 29—588 |
| 3,193,366 | 7/1965 | Clark | 29—588 |
| 2,804,404 | 8/1957 | Thiessen | 117—119.6 |
| 3,515,585 | 6/1970 | Chamberlin et al. | 117—119.6 |

MURRAY KATZ, Primary Examiner

R. M. SPEER, Assistant Examiner

U.S. Cl. X.R.

29—588; 117—65.2, 119.6, 161 P